(12) United States Patent
Thompson et al.

(10) Patent No.: US 9,268,979 B2
(45) Date of Patent: Feb. 23, 2016

(54) SYSTEM AND METHOD FOR AIMING AND CALIBRATING A DATA READER

(71) Applicant: Datalogic ADC, Inc., Eugene, OR (US)

(72) Inventors: Ryan B Thompson, Eugene, OR (US); Alan Shearin, Eugene, OR (US); Brett T Howard, Eugene, OR (US)

(73) Assignee: Datalogic ADC, Inc., Eugene, OR (US)

(*) Notice: Subject to any disclaimer, the term of this patent is extended or adjusted under 35 U.S.C. 154(b) by 0 days.

(21) Appl. No.: 14/481,571

(22) Filed: Sep. 9, 2014

(65) Prior Publication Data
US 2015/0069123 A1    Mar. 12, 2015

Related U.S. Application Data

(60) Provisional application No. 61/875,503, filed on Sep. 9, 2013.

(51) Int. Cl.
| | |
|---|---|
| G06K 7/00 | (2006.01) |
| G06K 7/015 | (2006.01) |
| G06K 7/14 | (2006.01) |
| G06K 7/10 | (2006.01) |

(52) U.S. Cl.
CPC .............. *G06K 7/0095* (2013.01); *G06K 7/015* (2013.01); *G06K 7/1096* (2013.01); *G06K 7/1456* (2013.01)

(58) Field of Classification Search
CPC ............... G06K 7/00; G06K 7/10; G02B 5/00
USPC ........................ 235/438, 462.14, 459, 462.32
See application file for complete search history.

(56) References Cited

U.S. PATENT DOCUMENTS

| | | | |
|---|---|---|---|
| 5,464,972 A | 11/1995 | Massieu et al. | |
| 5,550,362 A | 8/1996 | Sherman | |
| 5,783,811 A | 7/1998 | Feng et al. | |
| 5,894,529 A * | 4/1999 | Ting ............................. | 382/312 |

(Continued)

FOREIGN PATENT DOCUMENTS

| | | |
|---|---|---|
| JP | 2007-324655 A | 12/2007 |
| KR | 10-2006-0065657 A | 6/2006 |
| KR | 10-2008-0053508 A | 6/2008 |
| WO | WO 2006/120685 A3 | 11/2006 |
| WO | WO 2007/038199 A1 | 4/2007 |

OTHER PUBLICATIONS

Gremban et al., "Geometric Camera Calibration Using Systems of Linear Equations," 1988 IEEE International Conference on Robotics and Automation, pp. 562-567, Apr. 1988.

(Continued)

*Primary Examiner* — Edwyn Labaze
(74) *Attorney, Agent, or Firm* — Stoel Rives LLP

(57) ABSTRACT

A data reading system including one or more imagers and a lower main housing structure with a horizontal surface and a horizontal window, across which items to be read are passed. At least one or more of the imagers in the data reading system is a part of a top-down data reader having a generally downwardly-facing field of view projecting through a scan window and onto the horizontal surface and the horizontal window. The top-down data reader may be freely repositioned at a range of height positions and angular configurations for processing items of various dimensions. The data reading system may further include a calibration system for assisting in adjusting the field of view of the top-down data reader to ensure proper aim and focus of the top-down data reader after adjustment.

16 Claims, 10 Drawing Sheets

(56) References Cited

U.S. PATENT DOCUMENTS

| | | | |
|---|---|---|---|
| 6,223,986 B1 | 5/2001 | Bobba et al. | |
| 6,236,709 B1 | 5/2001 | Perry et al. | |
| 6,332,575 B1 * | 12/2001 | Schuessler et al. | 235/462.13 |
| 6,336,587 B1 | 1/2002 | He et al. | |
| 6,497,366 B1 * | 12/2002 | Burkey et al. | 235/462.25 |
| 6,766,955 B2 | 7/2004 | Patel et al. | |
| 6,824,058 B2 | 11/2004 | Patel et al. | |
| 6,866,199 B1 | 3/2005 | Keech et al. | |
| 7,252,234 B2 * | 8/2007 | Wilde et al. | 235/462.1 |
| 7,287,699 B2 | 10/2007 | Liu | |
| 7,527,207 B2 | 5/2009 | Acosta et al. | |
| 7,557,835 B2 | 7/2009 | Douret et al. | |
| 7,963,444 B2 | 6/2011 | McCormick et al. | |
| 8,028,916 B2 * | 10/2011 | Herwig et al. | 235/462.21 |
| 2001/0027995 A1 * | 10/2001 | Patel et al. | 235/383 |
| 2004/0211836 A1 | 10/2004 | Patel et al. | |
| 2006/0088196 A1 | 4/2006 | Popovich et al. | |
| 2006/0261157 A1 | 11/2006 | Ostrowski et al. | |
| 2007/0012789 A1 | 1/2007 | Hartney et al. | |
| 2008/0143838 A1 | 6/2008 | Nadabar et al. | |
| 2009/0026271 A1 | 1/2009 | Drzymala et al. | |
| 2009/0095047 A1 | 4/2009 | Patel et al. | |
| 2009/0095814 A1 | 4/2009 | Haggerty et al. | |
| 2009/0166424 A1 | 7/2009 | Gerst et al. | |
| 2010/0116887 A1 | 5/2010 | Barkan et al. | |
| 2010/0314448 A1 | 12/2010 | Thuries et al. | |
| 2011/0036907 A1 * | 2/2011 | Connelly | 235/383 |
| 2011/0315770 A1 | 12/2011 | Patel et al. | |
| 2012/0187191 A1 | 7/2012 | Olmstead | |
| 2013/0200150 A1 * | 8/2013 | Reynolds et al. | 235/438 |

OTHER PUBLICATIONS

Heikkilä et al., "A Four-Step Camera Calibration Procedure with Implicit Image Correction," Conference on Computer Vision and Pattern Recognition, IEEE Computer Society, pp. 1106-1112, Jun. 17, 1997.

Heikkilä, "Geometric Camera Calibration Using Circular Control Points," IEEE Transactions on Pattern Analysis and Machine Intelligence, pp. 1066-1077, 2000.

Kannala, et al. "Geometric Camera Calibration," Wiley Encyclopedia of Computer Science and Engineering, pp. 1-20, Jan. 7, 2008.

Tsai, "A Versatile Camera Calibration Technique for High-Accuracy 3D Machine Vision Metrology Using Off-the-Shelf TV Cameras and Lenses," IEEE Journal of Robotics and Automation, vol. RA-3, No. 4, pp. 323-344, Aug. 1987.

Wang et al., "Camera Calibration by Vanishing Lines for 3-D Computer Vision," IEEE Transactions on Pattern Analysis and Machine Intelligence, vol. 13, No. 4, pp. 370-376, Apr. 1991.

Zhang, "Flexible Camera Calibration by Viewing a Plane from Unknown Orientations," The Proceedings of the Seventh IEEE International Conference on Computer Vision, vol. 1, pp. 666-673, 1999.

Zollner et al., "Comparison of Methods for Geometric Camera Calibration Using Planar Calibration Targets," Proceedings of the 28th Workshop of the Austrian Association for Pattern Recognition, pp. 237-244, 2004.

Bouguet, "Camera Calibration Toolbox for Matlab," www.vision.caltech.edu/bouguet/calib_doc, Jul. 9, 2010.

International Searching Authority, International Search Report and Written Opinion for PCT/US2013/051872, Nov. 26, 2013.

* cited by examiner

SYSTEM AND METHOD FOR AIMING AND CALIBRATING A DATA READER

RELATED APPLICATION DATA

This application is a nonprovisional of and claims priority under 35 U.S.C. §119(e) to U.S. Provisional Application No. 61/875,503 filed on Sep. 9, 2013, the disclosure of which is hereby incorporated by reference.

BACKGROUND

The field of this disclosure relates generally to systems and methods for data reading and/or image capture, and more particularly, to systems and methods for aiming and calibrating a data reader in a data reading system.

Data reading devices are used to read optical codes, acquire data, and capture a variety of images. Optical codes typically comprise a pattern of dark elements and light spaces. There are various types of optical codes, including one-dimensional codes, such as a Universal Product Code ("UPC") and EAN/JAN codes, and stacked and two-dimensional codes, such as PDF417 and Maxicode codes.

Data reading devices are well known for reading UPC and other types of optical codes on packages, particularly in retail stores. One common data reader in such systems is an imaging reader that employs an imaging device or sensor array, such as a CCD (charge coupled device) or CMOS (complementary metal oxide semiconductor) device. Imaging readers can be configured to read both 1-D and 2-D optical codes, as well as other types of optical codes or symbols and images of other items. Though some imaging readers are capable of using ambient light illumination, an imaging reader typically utilizes a light source to illuminate the item being read to provide the required signal response in the imaging device. An imager-based reader utilizes a camera or imager to generate electronic image data. The image data, typically in digital form, is then processed to find and decode the optical code.

In some data reading systems, a top-down data reader is used to capture an image of a top surface of an item for decoding an optical code that may be present on that top surface. In such data reading systems, the top-down data reader's position may be permanently fixed at a preset height position, such as a factory setting or a user-defined setting. In such data reading systems with a fixed position for the top-down data reader, issues with aiming and calibration may not be problematic because the top-down data reader may be calibrated based on the fixed position. Since the top-down data reader's position is fixed or experiences only minimal movement, further calibration by the user is usually unnecessary.

However, data reading systems with fixed data readers have several disadvantages. For example, such systems may lack flexibility and cannot be easily adapted to fit a variety of workspace configurations. In addition, such systems are typically limited to processing items that do not exceed certain height dimensions based on the fixed height of the top-down data reader. A data reading system with a height adjustable and/or remotely mountable top-down data reader may address these limitations by providing a data reader that can be raised, lowered, or otherwise repositioned as desired. However, the present inventors have recognized that such height-adjustable and/or remotely mountable top-down data readers may have issues with aiming and calibration after adjustment. For instance, the top-down data reader may require calibration after some or all adjustments to ensure proper orientation and that the data reader has an acceptable depth of field to accurately capture the optical code or other target data. The present inventors have, therefore, determined that it would be desirable to provide a scanner or reading system with a movable/adjustable top-down data reader for maximizing flexibility, and a calibration subsystem for ensuring optimal performance of the top-down data reader.

Additional aspects and advantages will be apparent from the following detailed description of preferred embodiments, which proceeds with reference to the accompanying drawings.

BRIEF DESCRIPTION OF THE DRAWINGS

Understanding that drawings depict only certain embodiments and are not therefore to be considered limiting in nature, the embodiments will be described and explained with additional specificity and detail through the use of the accompanying drawings.

DETAILED DESCRIPTION OF EMBODIMENTS

With reference to the drawings, this section describes particular embodiments and their detailed construction and operation. The embodiments described herein are set forth by way of illustration only and not limitation. The described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. In other instances, well-known structures, materials, or methods of operation are not shown or not described in detail to avoid obscuring more pertinent aspects of the embodiments.

Various imager-based data readers and associated methods are described herein. Some embodiments of these data readers and systems may provide improved/enhanced reading performance by providing multiple image fields to capture multiple views. In the following description of the figures and any example embodiments, it should be understood that any image fields or fields of view related to any imager may be partitioned into two or more regions, each of which may be used to capture a separate view/perspective of the view volume. In addition to providing more views than imagers, such embodiments may enhance the effective view volume beyond the view volume available to a single imager having a single field of view.

In the following description of the figures, certain embodiments may reference use in a retail establishment as an example use of the data reading system. It should be understood that such use of the data reading system having the described features is merely one use for such a system and should not be considered as limiting. Other uses for such data reading systems with the characteristics and features described herein may be possible, for example, in an industrial location such as a parcel distribution (e.g., postal) station.

Figure 1:
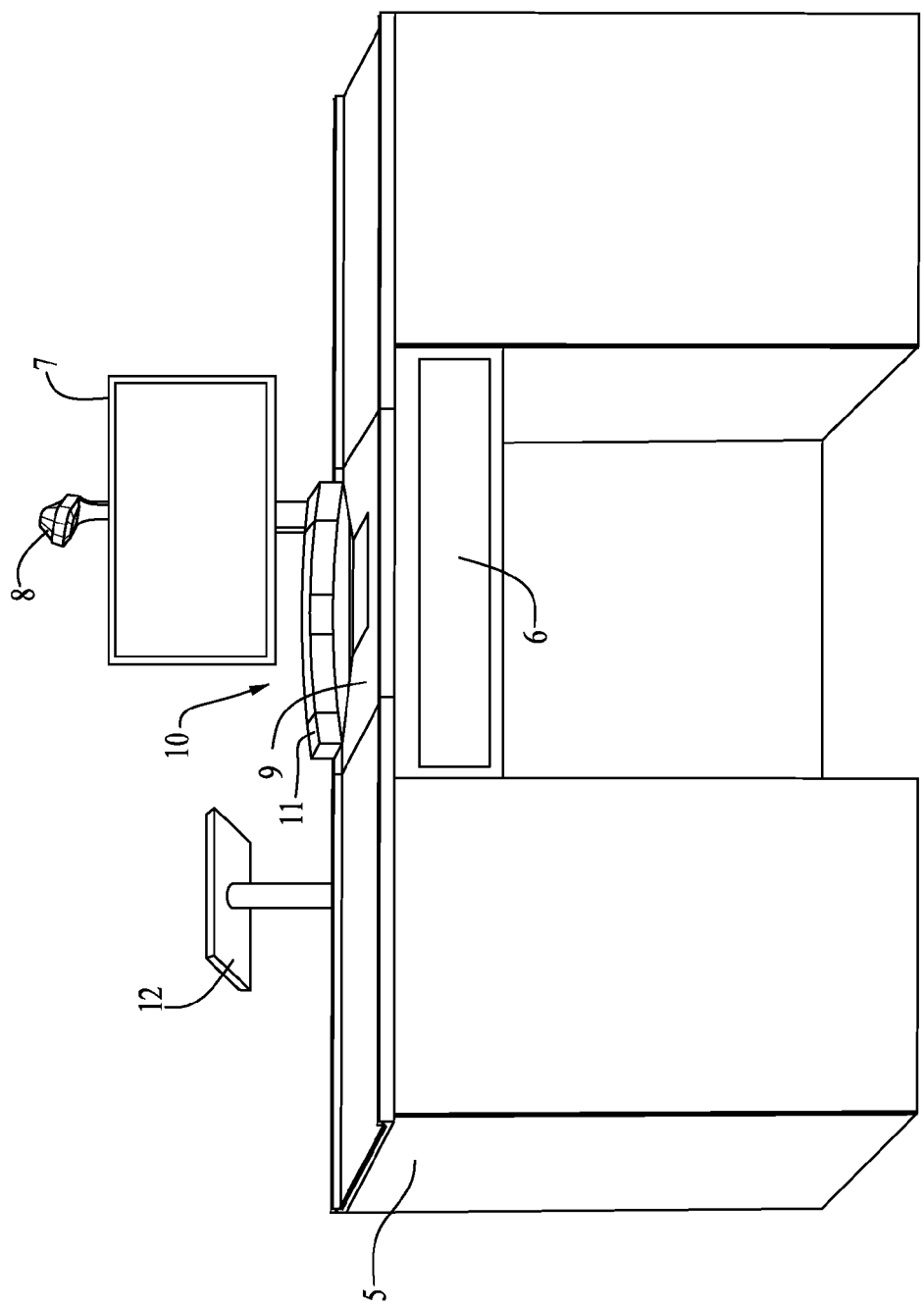
FIG. 1 is a perspective view of a counter structure having an embedded data reading system with a remotely mounted top-down data reader, according to one embodiment.
Figure 2:
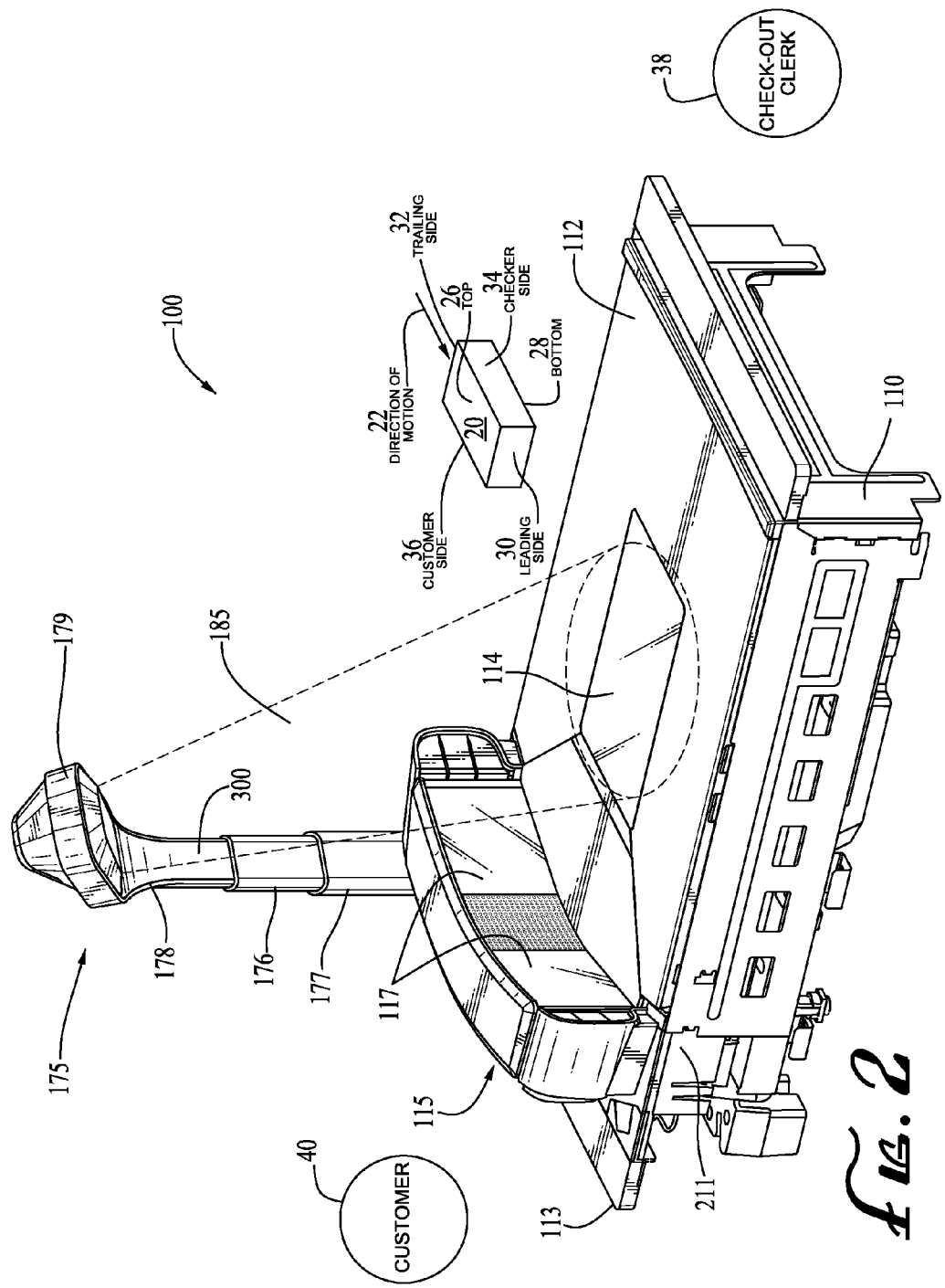
FIG. 2 is an isometric view of a data reading system removed from a counter structure, with the data reading system having an adjustable top-down data reader mounted thereon, according to another embodiment.

FIG. 1 illustrates an embodiment of a data reading system 10 having a top-down data reader (TDR) 8 remotely (or separately) mounted from other components of the data reading system 10. FIG. 2 illustrates an alternative embodiment of a data reading system 100 having a top-down data reader 175 integrally mounted to other features of the data reading system 100. For convenience, the following description typically refers to specific components of the data reading systems 10, 100 based on the particular figure/embodiment being discussed. For instance, when discussing FIG. 1, the description will refer to the top-down data reader by reference number 8, but when discussing FIG. 2, the description will refer to the top-down data reader by reference number 175. However, it should be understood that, unless specifically noted otherwise, the top-down data reader 8 and data reading system 10 of FIG. 1 may include the same or substantially similar components/features as the top-down data reader 175 and data reading system 100 of FIG. 2.

As mentioned briefly above, FIG. 1 is a perspective view of a counter structure 5 having a data reading system 10 embedded or mounted therein according to one embodiment. The counter structure 5 may include a cash drawer 6 positioned beneath the data reading system 10, and a monitor 7 positioned behind the data reading system 10 to allow a checker to easily view processing information, such as data obtained from successful scans and/or from weighing items 20 (see FIG. 2). The data reading system 10 further includes a top-down data reader 8, a generally horizontal platter 9, and a raised upper section 11 extending upwardly from an end of the platter 9. The top-down data reader 8 includes or houses one or more imagers for capturing and processing optical codes (such as barcodes) or other target data (such as RFID tags) on the items 20. Additional details of the top-down data reader 8, the platter 9, and the raised upper section 11 are described below with respect to FIGS. 2-11.

The top-down data reader 8 is mounted onto the counter structure 5 (or another structure thereon) so that the top-down data reader 8 is positioned above the raised upper section 11 and has a field of view facing downward toward the platter 9. For instance, in one embodiment, the top-down data reader 8 may be mounted to a top or side portion of the monitor 7. Alternatively, the top-down data reader 8 may be mounted remotely to another surface/portion of the counter structure 5 or mounted to other structures, such as to a check-writing platform 12, as desired.

FIG. 2 illustrates a data reading system 100 with an adjustable top-down data reader 175 mounted to or formed as an integral part of a cover or platter 112 (or mounted to or formed as an integral part of a lower base section 110) and an exemplary item 20 (e.g., a grocery item) that may be passed through a view volume of the data reading system 100. The data reading system 100 is illustrated as a two-plane or bioptic reader having a generally horizontal window 114 and a generally vertical split window 117. The view volume may be a function of the enclosure and style of the data reading system 100 and the perspectives of the views in which images of the item 20 are captured. For clarity purposes, a perspective may encompass a location, direction, angle, or any combination of the foregoing, that characterizes a point-of-view for seeing, imaging, visualizing via machine vision, or illuminating a part or whole of the item 20. Single or multiple views may be obtained through each window 114, 117 depending on the design of the reader 100. The collection of all views together constitutes a cumulative view, which defines the viewing volume or scan volume of the data reading system 100. Different views may enable reading of an optical code on different sides of the item 20.

For general purposes of discussion, the item 20 is represented as a six-sided, box-shaped package having a top surface 26, a bottom surface 28, a leading side 30, a trailing side 32, a checker side 34, and a customer side 36. In some instances, the item 20 may be described with respect to its direction of motion 22 across a generally horizontal window 114 of a cover or platter 112. In addition, any description regarding the position of a checkout clerk 38 and a customer 40 is meant to facilitate description and establish a frame of reference related to a typical position of the checkout clerk 38 and the customer 40, as illustrated in FIG. 2, and is not intended to be limiting. It should be understood that the data reading system 100 may be used without a checkout clerk 38, and/or the customer 40 (or clerk 38) may be positioned at any side of the data reading system 100. In addition, the item 20 is described as a box-shaped package for convenience, but it should be understood that the item 20 may encompass other shapes, including, for example, round fruits or vegetables, cylindrical cans, irregularly shaped packages, such as a bag of potatoes, potato chips, or the like.

With reference to FIG. 2, the following section briefly describes components of the data reading system 100 and provides an example operation thereof. As mentioned previously, the data reading system 100 may be a two-plane or bioptic reader having a lower base section 110 supporting a platter 112, and a raised upper section 115 extending from and protruding upwardly from the lower base section 110 (and the platter 112). One or more data readers (not shown) are housed within lower base section 110 and/or the upper section 115, and project one or more fields-of-view through the respective windows 114, 117 to attempt to read an optical code on the item 20. The components of the data reading system 100 (e.g., the lower base section 110 and the platter 112) may be directly or indirectly coupled to a common base or chassis 211.

The data reading system 100 includes an upper reader module, in this embodiment configured as a top-down data reader 175, for capturing data from the top surface 26 of the item 20 as well as potentially providing (from its orientation as shown in FIG. 2) some additional reading capability of the trailing side 32, and/or the customer side 36. The top-down data reader 175 comprises an upwardly extending post body or section 176 extending along a vertical axis that may be generally perpendicular in relation to the platter 112. The post section 176 may be mounted or otherwise secured to the chassis 211 (or alternatively to the base 110 or platter 112) via a lower mounting end 177 and includes a housing structure 179 supported adjacent an opposite upper end 178. The housing structure 179 is sized and dimensioned to house one or more imager(s) or read modules (not shown) operable for capturing various views of the object 20. Further details and example embodiments of the internal optics and electronics for the top-down data reader 175 are disclosed in U.S. application Ser. No. 13/895,258, filed May 15, 2013 (published as U.S. Pub. No. 2013/0306727), the disclosure of which is hereby incorporated by reference.

The post 176 may be fabricated as a single unitary part of the data reading system 100 and/or may be rigidly attached or screwed into an internal structure of the chassis 211. In some embodiments, the post 176 may be manufactured as a separate, standalone component configured to be releasably coupled to the chassis 211 to improve versatility of the data reading system 100. For example, the lower mounting end 177 of the post 176 may be threaded or have a mounting surface and the chassis 211 may include a corresponding opening or bore with matching threads sized to receive and engage the threaded mounting end 177 so that the post 176 can be threaded and secured into the chassis 211. The chassis 211 may include a number of such threaded bores positioned at various points, such as, for example, one or more openings along the end 113. The threaded bores could also be located at various points on the raised upper section 115. When the top-down data reader 175 is connected/assembled with the chassis 211, the combination forms an integrated scanner comprising the base data reading system 100 and the top-down data reader 175.

A releasably coupled post 176 not only provides additional versatility to the overall data reading system 100, but may also provide easy access to replace or upgrade the post 176 (such as to provide a different post height), repair a malfunctioning top-down data reader 175, or repair/upgrade optics or components of the imagers/readers in the top-down data reader 175, without having to replace larger components, such as the chassis 211 or the platter 112, of the data reading system 100. In other embodiments, other suitable mating mechanisms or keyed features may be used to releasably attach the post 176, such as, protruding tabs and matching grooves, pins and slots, magnets, snap-fitting features, and other suitable connection/attachment mechanisms.

Preferably, the top-down data reader 175 is adjustable to account for a variety of different shapes and sizes of the items 20 being passed through the read volume and across the platter 112. In one embodiment, the post 176 may include two or more telescopic sections for vertically retracting and extending the post 176 to a desired height within a range of height positions. For example, the post 176 may be extended upwardly to accommodate one or more larger sized objects 20. Once those large objects 20 have been scanned, the post 176 may thereafter be retracted downwardly to a baseline operating position (or maintained at the upper position if desired).

In some embodiments, the post 176 may also include a locking feature to lock the post 176 at the desired height and prevent the post body 176 from inadvertently collapsing or retracting. For example, the post 176 may include a depressible push button and a number of apertures sized to receive the push button for releasably locking the post 176 at a desired height. To extend the post body 176 to a different height, the push button is depressed inwardly and the telescoping sections slide to the new height. At that position, the push button engages another one of the apertures to lock the post 176 at the new height. In other embodiments, the adjustable pole height may be actuated via a motor, providing for automatic and/or remote-controlled height adjustment. In yet other embodiments, the post body 176 may be constructed of flexible material allowing for bending and/or snaking the top-down data reader 175 to various positions and configurations as desired. Additional details of these and other embodiments for an adjustable top-down data reader are described in U.S. application Ser. No. 13/895,258, the disclosure of which was previously incorporated by reference.

Figure 3:
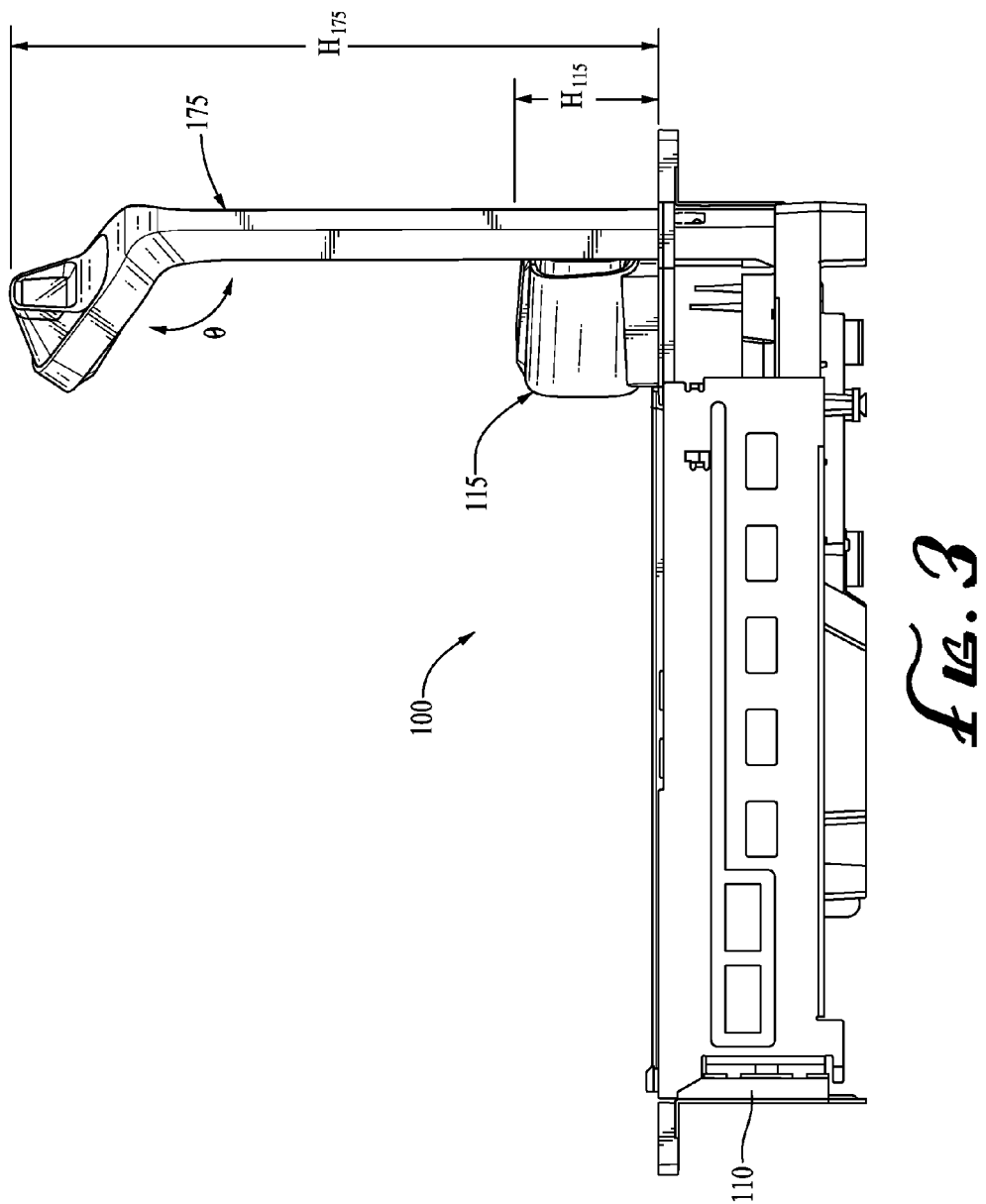
FIGS. 3 and 4 are side elevation views of the data reading system of FIG. 2 showing height dimensioning of the adjustable top-down data reader.
Figure 4:
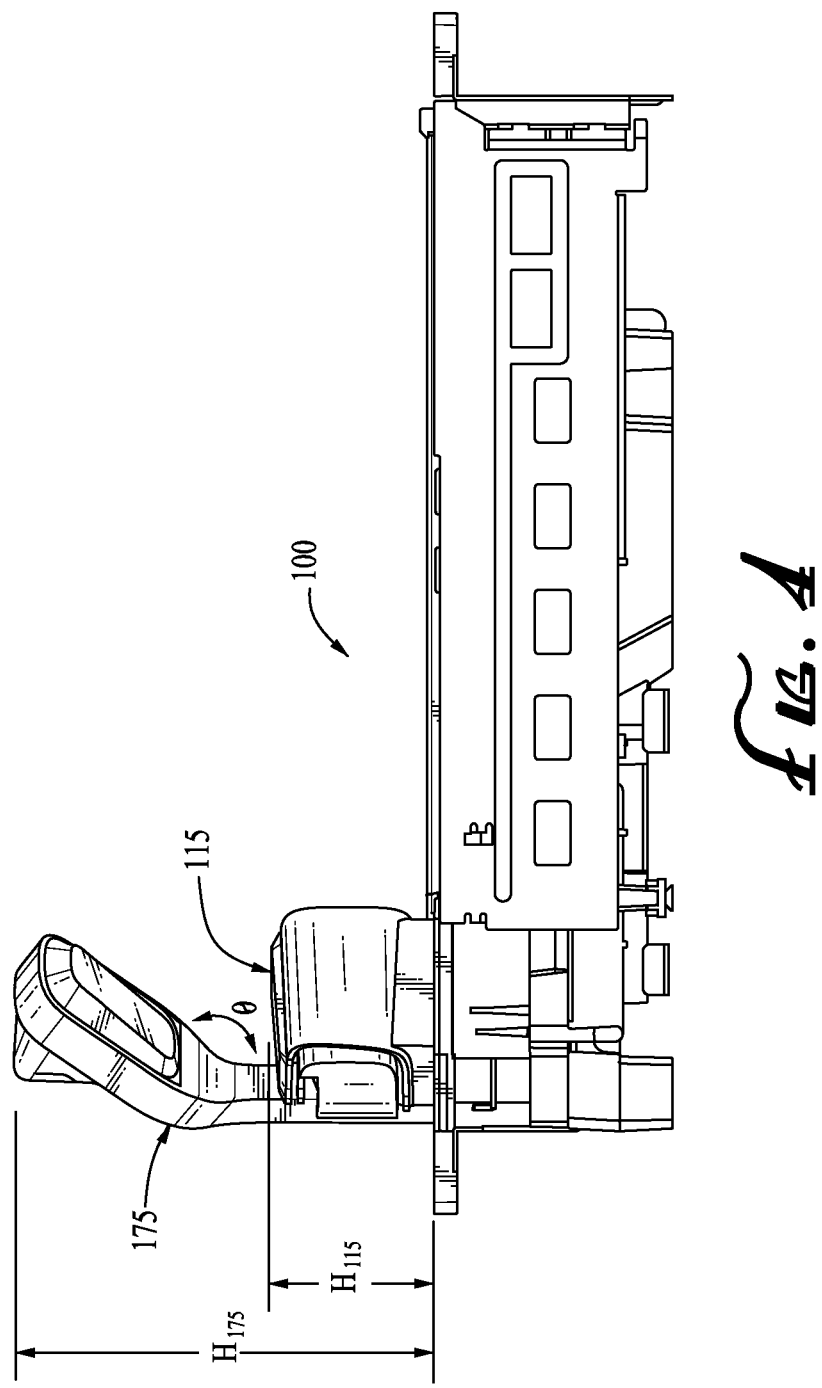
Figures 5, 6:
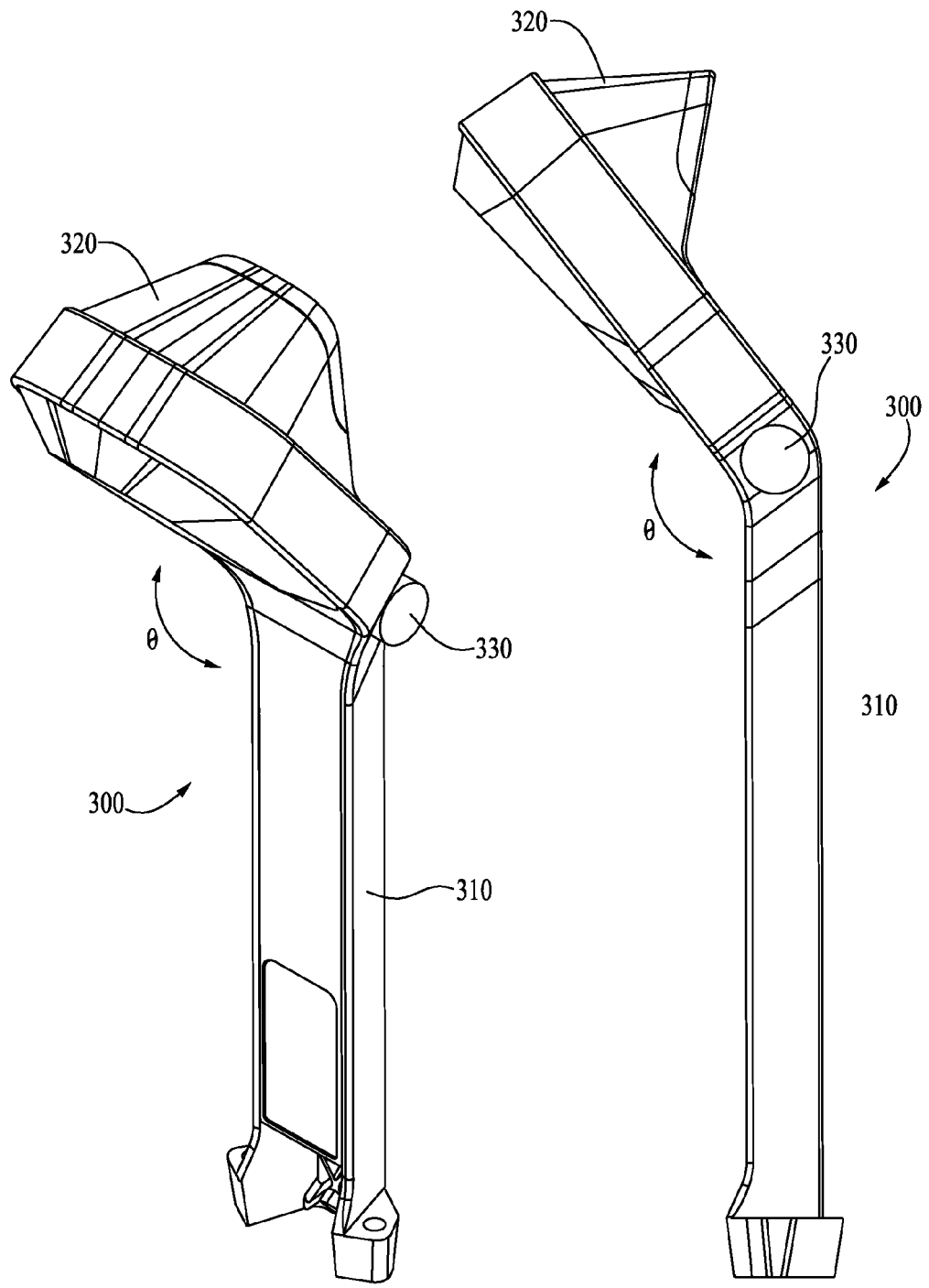
FIG. 5 is an isometric view of a housing of the top-down data reader of FIG. 2.
FIG. 6 is a right side elevation view of the housing of the top-down data reader of FIG. 5.

With reference to FIGS. 3 and 4, the top-down data reader 175 extends to an upper height position $H_{175}$ for effectively capturing a top-down view of at least the top surface 26 of the object 20. Referring to FIG. 3, the top-down data reader 175 is illustrated as extending to the upper height position $H_{175}$ (as measured from the counter surface or platter surface) at least equal to or above the height of the raised upper section 115 to effectively capture a top-down view of the top surface 26 of the object 20. Generally speaking, the top-down data reader 175 may be positioned at the upper height $H_{175}$ approximately two to three times higher than the lower height $H_{115}$ of the raised upper section 115. For instance, in one configuration, the raised upper section 115 may have a height $H_{115}$ ranging from between 2 and 5 inches (5 cm to 12.7 cm), and the height $H_{175}$ of the top-down data reader 175 may have a height $H_{175}$ ranging from 7 inches (17.8 cm) to 10 inches (25.5 cm) or some other suitable height with clearance over the raised upper section 115.

FIG. 4 illustrates the top-down data reader 175 in an alternate configuration disposed at the lower height $H_{115}$. Though the top-down data reader 175 may, in some instances, not have a field of view capable of viewing the top side 26 of items 20 (as compared to the configuration illustrated in FIG. 3), top-down data reader 175 may nonetheless provide improved top-down reading capabilities to the data reading system 100. Such a configuration for a top-down data reader 175 may also be better suited to fit within certain checkstand configurations, such as beneath a check-writing shelf, point-of-sale display or point-of-sale keyboard.

In some embodiments, the top-down data reader 175 may be provided with head angle adjustment mechanisms in addition to the height adjustment mechanisms described with respect to FIGS. 2-4 and thus enabling a single construction to be adaptable for variable heights and view angles. For instance, with particular reference to FIGS. 5-6, the top-down data reader 300 includes a post section 310 (which may comprise an adjustable construction as described previously) and a head section 320 interconnected by a pivot mechanism 330. The pivot mechanism 330 allows for orientation of the head section 320 via a range of adjustments of the head angle θ to arrange the head section 320 as desired and aim the field of view of the top-down data reader 300 into the read region. In some embodiments, the pivot mechanism 330 may include stops, a locking device, and/or other mechanism(s), such as a ratchet, to retain the head section 320 at the desired angle θ once moved/pivoted into the desired position. In other embodiments, the pivot mechanism 330 may be a ball-and-socket joint to allow for movement of the head section 320 along a central axis of the post section 310 and rotational movement about the central axis of the post section 310.

The embodiments described above with respect to FIGS. 1-6 illustrate example embodiments of data reading systems 10, 100 with adjustable top-down data readers 8, 175, 300 for improved data reading capabilities. It should be understood that the described embodiments are meant only to illustrate example embodiments having an adjustable top-down data reader 8, 175, 300 and other arrangements not specifically described herein may be possible without departing from the principles of the disclosure. In each of the described embodiments, any adjustment of the top-down data reader 8, 175, 300 may require the clerk 38, or other user, to employ suitable calibration techniques to ensure that the imager/reader module in the top-down data reader 8, 175, 300 is properly focused and has a properly aimed field of view for reading items 20. The following discussion with respect to FIGS. 7-11 describes example embodiments of calibration techniques that may be used to calibrate the adjustable top-down data reader 8, 175, 300.

Figure 7:
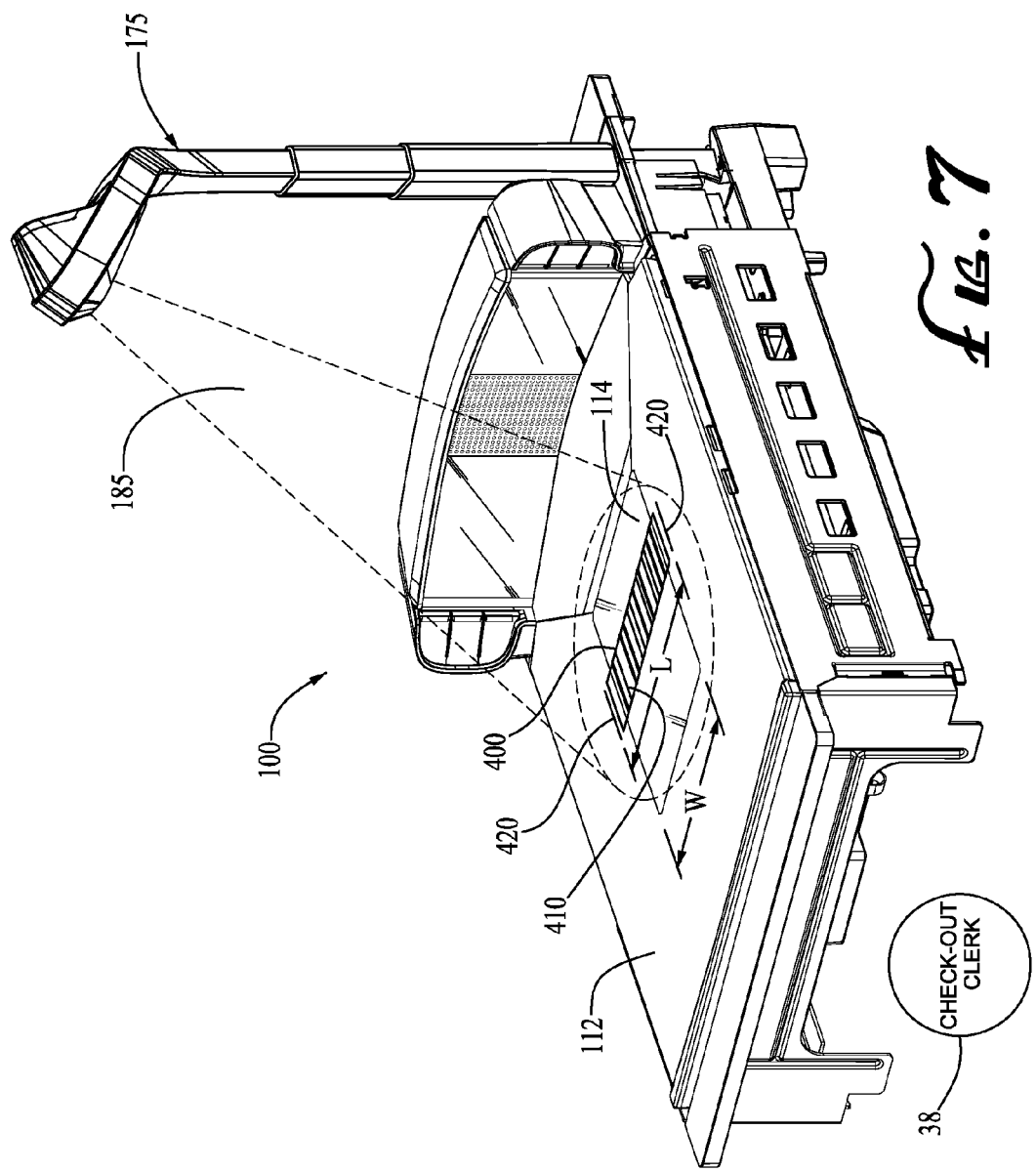
FIGS. 7-11 are isometric views illustrating various embodiments for an aiming and calibration system of the data reading system of FIG. 2.

With reference to FIG. 7, the data reading system 100 may include one or more calibration features for calibrating the top-down data reader 175 after adjustment or to accommodate remote mounting of the top-down data reader 8. For instance, in one embodiment, the data reading system 100 may include a reference label 400 containing a sample or calibration barcode 410. The reference label 400 is of suitable size such that a full image of the reference label 400 may be captured by the field of view 185 of the top-down data reader 175. In addition, the size of the reference label 400 is specifically calibrated such that the top-down data reader 175 only captures/decodes the calibration barcode 410 when the top-down data reader 175 is properly aimed (e.g., the field of view is approximately centered around the window 114) and at an acceptable focal distance for decoding the barcode. In some embodiments, the surface of the platter 112 may include etched, printed, or otherwise formed reference markings/indicia 420 for aligning the reference label 400 during a calibration process. The indicia 420 may be formed on either side of the window 114 and spaced apart by a distance approximately equal to the length L of the reference label 400. The indicia 420 may be used as a guide for arranging the reference label 400 on the platter 112 in a proper position for calibrating the top-down data reader 175.

In an alternative embodiment, the reference label 400 may have a length L equal to the width W of the window 114. Such a configuration may avoid the need to mark the indicia 420 on the platter 112, thereby providing a cleaner presentation of the data reading system 100. In some embodiments, the reference label 400 may have a magnetic surface on its bottom surface opposite the calibration code 410 and the platter 112 may include a metallic surface for retaining the reference label 400 in position during the calibration process. An example calibration process using the reference label 400 and the indicia 420 is described below.

As mentioned previously, during use of the data reading system 100, it may be necessary or desirable to adjust the height of the top-down data reader 175 (see FIGS. 2-4) and/or the angle of the head section 320 (see FIGS. 5-6) for processing larger or smaller items 20. Accordingly, after the top-down data reader 175 has been adjusted as desired, the clerk 38 (or other user) may position the reference label 400 on the platter 112 and align the reference label with the indicia 420 (or with the window 114 in embodiments without indicia 420) on the platter 112. Once the reference label 400 is positioned on the platter 112, the top-down data reader 175 thereafter attempts to decode the calibration code 410 on the reference label 400.

The data reading system 100 may generate a feedback signal, such as by emitting a beep or other sound (including not emitting any sound), sending a message to the clerk 38 or customer 40 (such as via a connected nearby computer terminal), or otherwise notifying the clerk 38 (or customer 40) of the status of the top-down data reader 175. For example, if the reference label 400 is detected and the calibration code 410 is decoded, the data reading system 100 emits a beep to notify the clerk 38 (or customer 40) that the top-down data reader 175 is properly aimed and is ready for use. Alternatively, if the reference label 400 is not detected and/or the calibration code 410 is not decoded, the data reading system 100 may emit a different sound (or emit no sound at all) to notify the clerk 38 (or customer 40) that the top-down data reader 175 requires further calibration. In response to receiving notification that the top-down data reader 175 is not properly calibrated, the clerk 38 may adjust focal features (e.g., optical magnification, focal length) of the imagers/readers of the top-down data reader 175 or the focal features may be automatically adjusted by the top-down data reader 175 or other component of the data reading system 100. Alternatively, or in addition, the clerk 38 may adjust the height position of the top-down data reader 175 and/or the position of the head section 320 until the top-down data reader 175 successfully decodes the reference label 400. Thereafter, the clerk 38 may remove the reference label 400 from the platter 112 and store it for future use. The clerk 38 may continue processing the items 20 using the data reading system 100.

Figure 8:
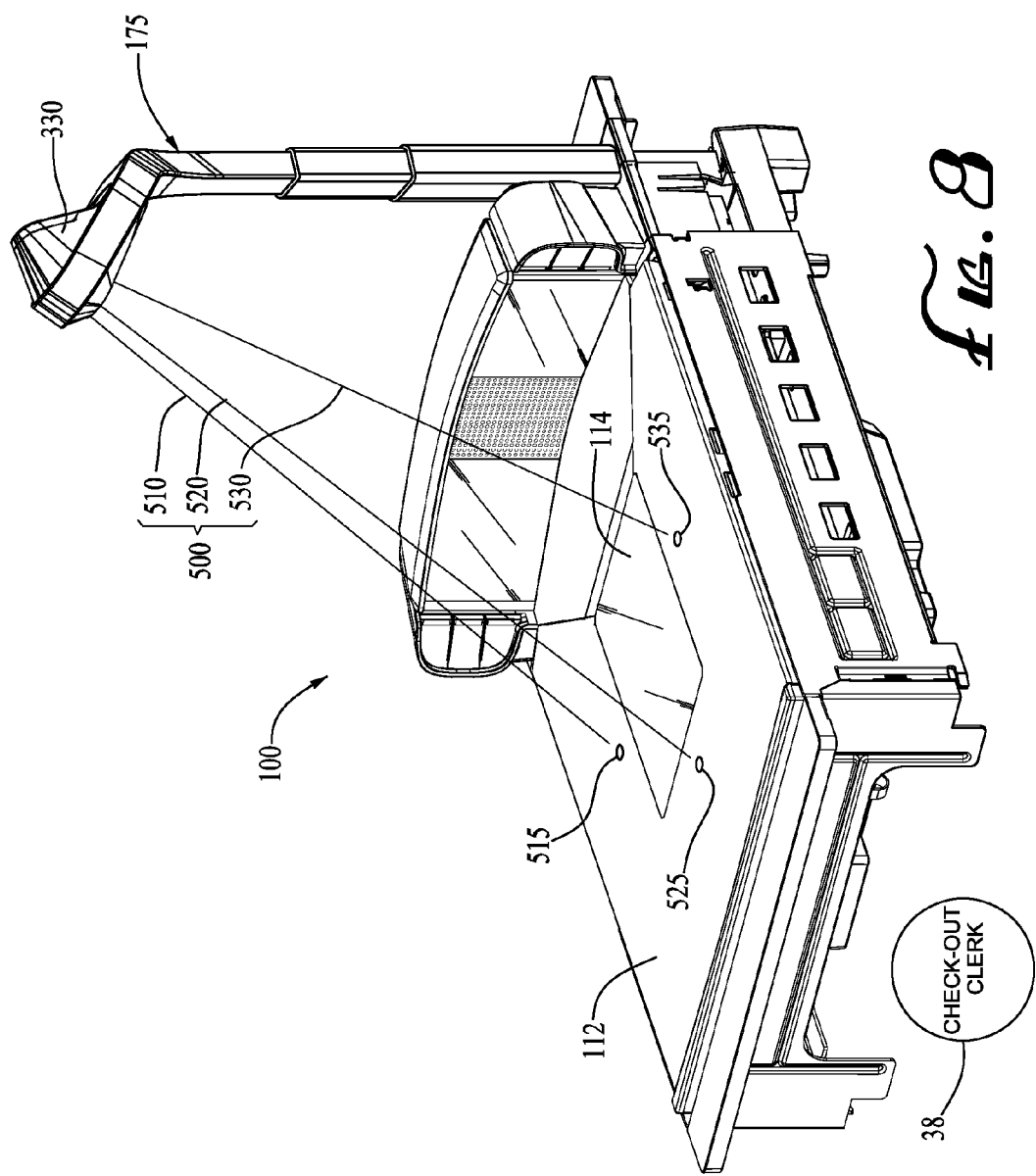

FIG. 8 illustrates another system and associated method for calibrating the top-down data reader 175. As illustrated in FIG. 8, the top-down data reader 175 may include an aiming aid 500. In one example, the aiming aid 500 may comprise a pattern of multiple points (e.g., beams of light) 510, 520, 530 projected from the head section 330 of the top-down data reader 175 toward the platter 112. In some embodiments, the platter 112 may include reference markings or indicia 515, 525, 535 for aligning or positioning each of the multiple points 510, 520, 530 to ensure that the top-down data reader 175 is aimed at a desired read zone (e.g., the window 114) and properly focused.

As with the embodiment described with respect to FIG. 7, after adjustment of the top-down data reader 175, the clerk 38 powers on the aiming aid 500 and attempts to align the multiple points 510, 520, 530 projected from the head section 330 with the corresponding reference markings 515, 525, 535 (e.g., point 510 is aligned with marking 515, point 520 is aligned with marking 525, and point 530 is aligned with marking 535) on the platter 112. Once aligned, the clerk 38 may verify whether the top-down data reader 175 is properly aimed for reading data by using a reference label (such as reference label 400 described in FIG. 7) or processing an item 20.

In some embodiments, alignment using the aiming guide 500 may ensure that the field of view 185 of the top-down data reader 175 is properly aimed at the target read zone. After such alignment, the clerk 38 may also wish to adjust focal features of the top-down data reader 175 to ensure that the imagers/read modules are properly focused. In some embodiments, the imagers/read modules of the top-down data reader 175 have a fixed focus capable of accurately capturing data from any items 20 passing through the read zone regardless of the height of the top-down data reader 175. In such embodiments, the clerk 38 need only properly align the head section 320 with respect to the platter 112 and window 114, and the fixed focus of the top-down data reader 175 will then ensure that the item 20 is read when it passes through the read zone.

For instance, the imagers in the top-down data reader 175 may have appropriate focal characteristics and a sufficiently large depth of field such that the top-down data reader 175 remains focused through a predetermined range of height adjustments (e.g., from a low position illustrated in FIG. 4 to a high position illustrated in FIG. 3) to accurately read barcode labels on the items 20. In such embodiments, the maximum and minimum height position of the top-down data reader 175 may be governed by the depth of field of the imagers/read modules (i.e., a larger depth of field allows for a larger range of height adjustments for the top-down data reader 175). Accordingly, the top-down data reader 175 remains focused and is capable of reading items 20 regardless of the height position of the top-down data reader 175.

Figure 9:
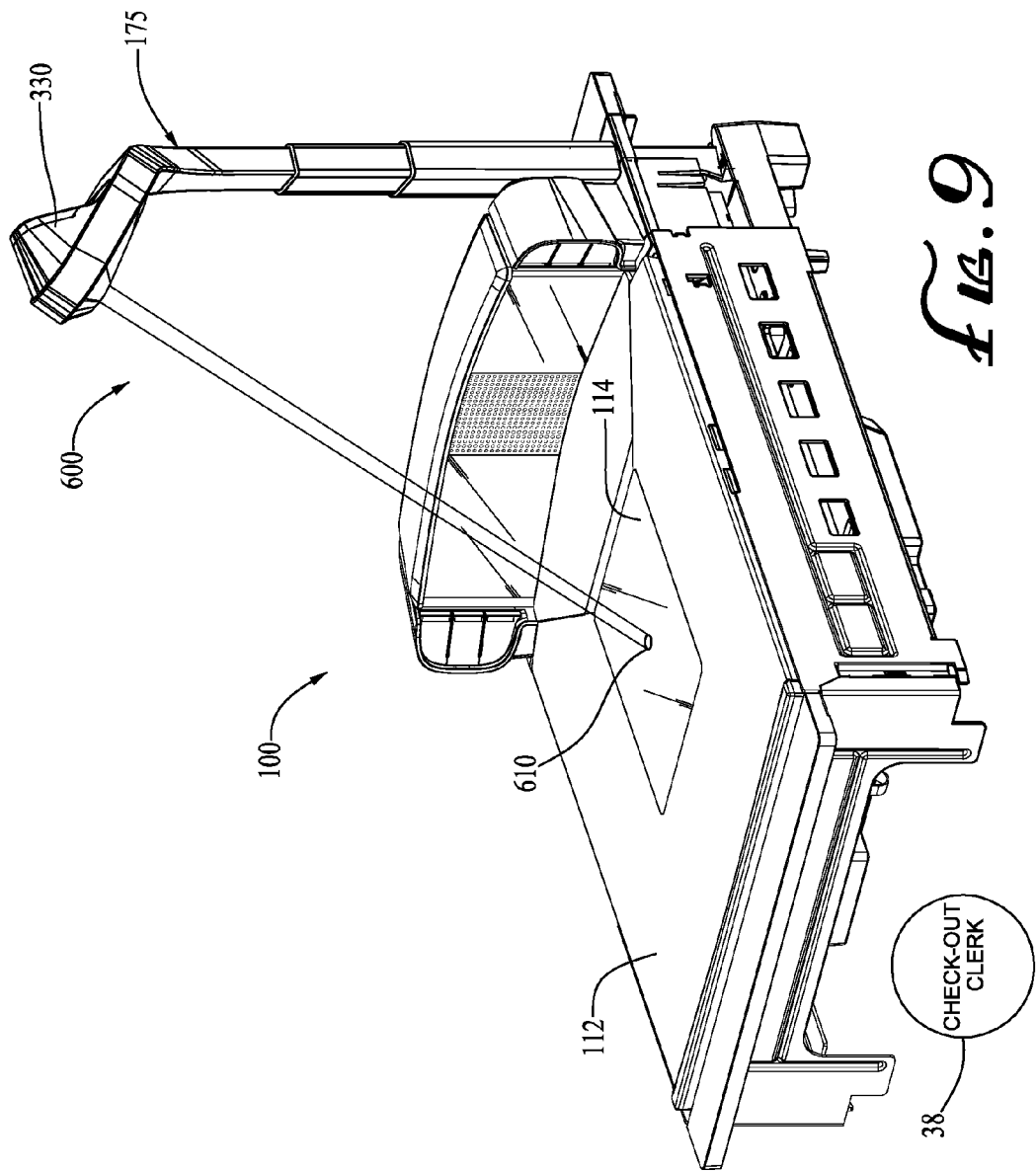

FIG. 9 illustrates another system and associated method for calibrating the top-down data reader 175 after adjustment. Similar to the aiming aid 500 described with respect to FIG. 8, the data reading system 100 may include an aiming aid 600 projecting a single colored laser onto the platter 112 (or window 114) to produce a visible colored light spot 610 (e.g., a green spot) thereon. To ensure that the top-down data reader 175 is properly aimed for reading data (e.g., aimed at the center of the window 114 or other calibration point), the light spot 610 may be aligned with reference markings or other indicia on the platter (not shown, but may be similar to markings 520 described in FIG. 8). In other embodiments, the clerk 38 or user may align the light spot 610 with other structures or components of the data reading system 100. For instance, the light spot 610 may be aligned with a geometric mid-point of the window 114.

In some embodiments, the data reading system 100 may combine calibration features of the embodiments described in FIGS. 7-9. For instance, one combination may use both the aiming aid 500 (see FIG. 8) or the aiming aid 600 (see FIG. 9) and the reference label 400 (see FIG. 7). In such combinations, after desired adjustments have been made to the top-down data reader 175, the clerk 38 may position the reference label 400 on the platter 112 as described previously, and then may power on the aiming aid 600 and aim the colored spot 610 at a predetermined point or section of the reference label 400 to ensure that the top-down data reader 175 is properly aimed at the target read zone. For instance, the reference label 400 may include markings (e.g., at a beginning, central, or other portion of the reference label 400) for guiding/aiming the colored spot 610. Once the colored spot 610 is aligned with the markings on the reference label 400, the top-down data reader 175 attempts to capture the calibration barcode 410 on the reference label 400 in a similar fashion as previously described.

In other embodiments, the color spot 610 may change colors to provide feedback to the clerk 38 or customer 40 indicating whether there was a good or bad read of the reference label 400, which signals whether the top-down data reader 175 is properly calibrated or not. For instance, the aiming aid 600 may initially project the colored spot 610 in a first color (e.g., red) onto the reference label 400. When the top-down data reader 175 detects the reference label 400 and decodes the calibration code 410, the aiming aid 600 may alert the clerk 38 of the successful calibration by then projecting the colored spot 610 in a second color (e.g., green). The green colored spot 610 on the reference label 400 indicates to the clerk 38 that the top-down data reader 175 is ready for use. This feature of signaling proper calibration using a variable color scheme may be useful in heavy traffic and noisy areas (such as warehouses and checkout stands in retail stores) where the clerk 38 may not be able to adequately hear a beep or other sound from the top-down data reader 175.

Figure 10:
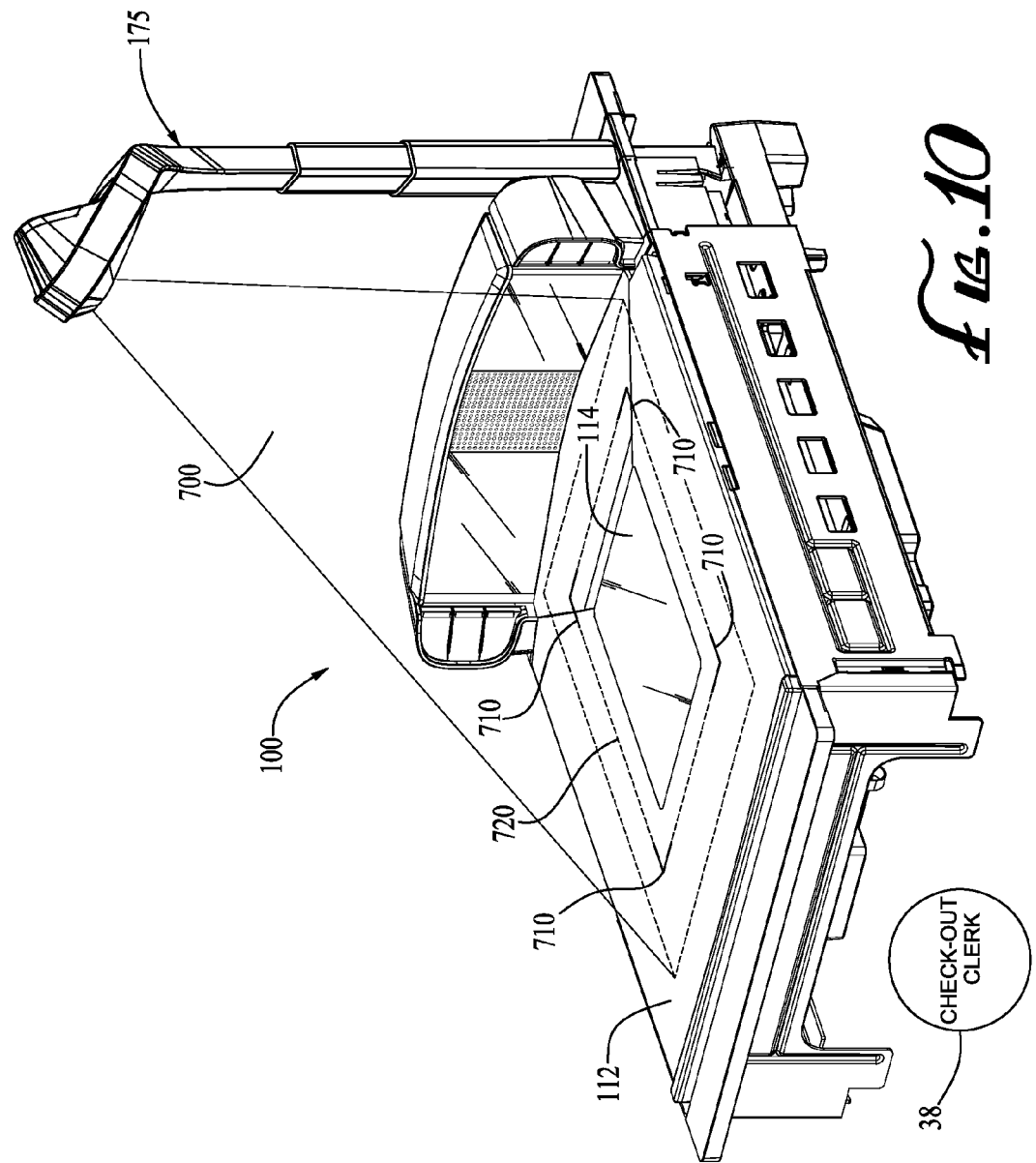

FIG. 10 illustrates another system and associated method for calibrating the top-down data reader 175 after adjustment or remote mounting. With reference to FIG. 10, the top-down data reader 175 projects an oversized field of view 700 covering a large portion (e.g., at least half or more) of the top surface area of the platter 112, including the entirety of the window 114. The platter 112 may include reference markings or key features 710 (such as a vertical or horizontal bars, L-brackets, circles, or other indicator marks) positioned on the platter 112 in any desired configuration to define a target read zone 720. For instance, FIG. 10 illustrates four key features 710, each in a shape resembling an L-bracket. The target read zone 720 defines an optimal region on the platter 112 for reading target data from an item 20 as the item 20 is passed through the read zone 720. In such embodiments, the top-down data reader 175 visibly detects the target read zone 720 based on identification of the key features 710 on the platter 112. In some embodiments, software used for processing/decoding the captured data may include instructions to only decode optical codes (or other target data) captured within the target read zone 720 and to ignore all other data (e.g., data that is captured outside the target read zone 720).

In some embodiments, the platter 112 may include four key features 710 spaced apart on the surface of the platter 112 to define a square- or rectangular-shaped target read zone 720 larger than the window 114. Since the field of view 700 is oversized, the field of view 700 overlaps with the target read zone 720 when the top-down data reader 175 is adjusted to a number of different height positions above the platter 112 (including being separately mounted as described with respect to FIG. 1) and/or the head section 330 is configured in various angular arrangements. With an oversized field of view 700, the clerk 38 (or customer 40) may not need to precisely align the top-down data reader 175 after adjustments because the field of view 700 is large enough (and the top-down data reader 175 is properly focused) to capture the target read zone 720 over a broad range of adjustments. Accordingly, the clerk 38 may simply make an adjustment to the top-down data reader 175 and continue processing items 20 without needing to calibrate the top-down data reader 175. In some embodiments, adjustments of the top-down data reader 175 may be limited to a predetermined range of adjustments (e.g., only certain heights and/or rotation angles are allowable) that are precisely calculated so that the oversized field of view 700 overlaps the target read zone 720 when an adjustment within the predetermined range is made to the top-down data reader 175.

Figure 11:
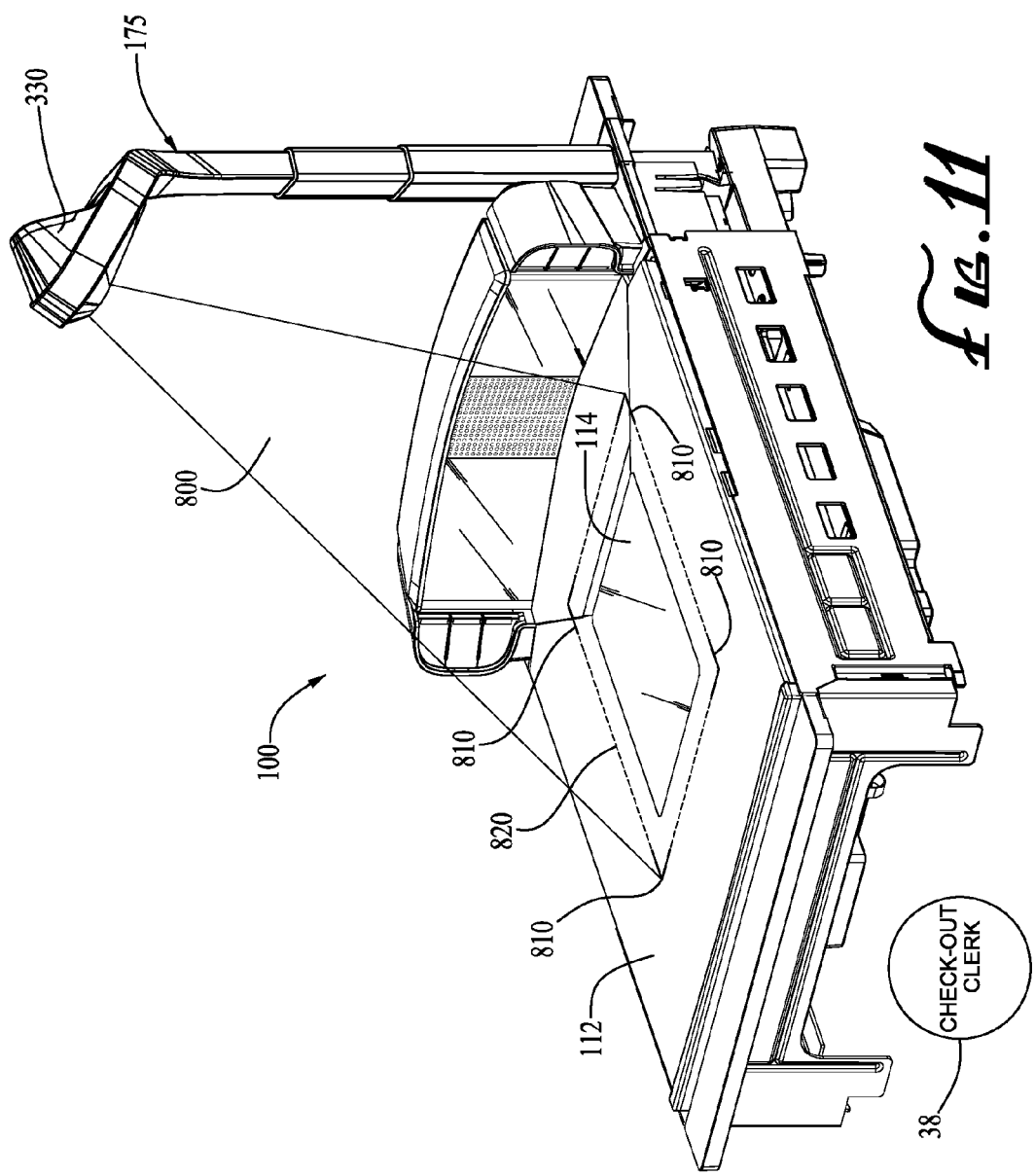

FIG. 11 illustrates another system and associated method for calibrating a field of view 800 of the top-down data reader 175. Similar to previous embodiments, the scanner 112 includes a number of key features 810 arranged on the surface of the platter 112 to define an optimal or preferred read zone 820. To determine whether the field of view 800 of the top-down data reader 175 is properly aimed and calibrated, the top-down data reader 175 may initiate and run an iterative guess-and-check protocol during which it captures one or more digital images of the surface of the platter 112. The digital images are then processed to identify the key features 810 and determine whether all the key features 810 are captured in an image. If only a subset of the key features 810 are captured (e.g., only the upper two of the four are captured), the data reading system 100 may provide feedback to the clerk 38 that the top-down data reader 175 is not properly aligned.

In some embodiments, the data reading system 100 may provide visual feedback to the clerk 38, such as via a monitor 7 (see FIG. 1), to guide the clerk 38 in making any adjustments. For instance, the clerk 38 may see a schematic of the surface of the platter 112 in the monitor showing the position of the four key features 810 and the window 114. The schematic may show which of the key features 810 were captured by the image and/or may show the other of the key features 810 that were not captured. With this information, the clerk 38 would understand how to adjust the top-down data reader 175. For example, the monitor 7 may show that the top two key features 810 (e.g., the features closest to the top-down data reader 175) are captured but the bottom two key features 810 are not captured. With this information, the clerk 38 (or customer 40) knows in which direction to reposition the top-down data reader 175 to align the field of view 800 as needed. Once all the key features 810 appear in the captured image, this indicates that the top-down data reader 175 is sufficiently aligned to properly capture data passing through the read zone 820.

In another embodiment, the visual feedback may be an image feed based on the view of the top-down data reader 175. For instance, the monitor 7 may show the user the view of the top-down data reader 175 and the user may simply need to adjust the top-down data reader 175 so that the scanner window 114 (or other reference features of the platter 112) is centered (or substantially centered) in the field of view 800.

Other embodiments are envisioned. Although the description above contains certain specific details, these details should not be construed as limiting the scope of the invention, but as merely providing illustrations of some embodiments/examples. In addition, although specifics details for the various calibration methods were discussed in accordance with specific embodiments, it should be understood that subject matter disclosed in one portion herein can be combined with the subject matter of one or more of other portions herein as long as such combinations are not mutually exclusive or inoperable.

The terms and descriptions used herein are set forth by way of illustration only and not meant as limitations. It will be obvious to those having skill in the art that many changes may be made to the details of the above-described embodiments without departing from the underlying principles of the invention(s).

The invention claimed is:

1. A data reading system for reading data on an item, the data reading system comprising:
   a main housing including a lower housing section containing a horizontal surface with a horizontal window and an upper housing section containing a vertical window, the horizontal surface of the lower housing section including a reference marking;
   a height-adjustable top-down data reader for capturing data from an item in a read zone, the top-down data reader having a downwardly-facing field of view projecting through a scan window and onto the read zone, the top-down data reader positioned at a height higher than a corresponding height of the upper housing section of the main housing; and
   a calibration system in communication with the top-down data reader, wherein the calibration system detects the reference marking on the horizontal surface and, in response to detecting the reference marking, generates a feedback signal indicating whether the field of view of the top-down data reader at an adjusted height position is targeting the read zone, the calibration system further comprising:
      a reference label bearing a calibration optical code, wherein after aligning a first end of the reference label with the reference marking on the horizontal surface, the calibration system processes the calibration optical code and generates a second feedback signal indicating whether the field of view of the top-down data reader is in focus.

2. The data reading system of claim 1, the calibration system further comprising a light source housed within the top-down data reader, the light source projecting a visible beam spot from the top-down data reader onto the horizontal surface of the lower housing section.

3. The data reading system of claim 2, further comprising a plurality of reference markings on the horizontal surface of the lower housing section positioned in a fixed relation to the horizontal window, wherein the light source projects a visible beam spot directed toward each of the plurality of reference markings on the horizontal surface.

4. The data reading system of claim 1, further comprising a plurality of reference markings arranged on the lower housing section and defining a peripheral boundary of the read zone, wherein the top-down data reader is further configured to detect the reference markings and determine, based on the detected reference markings, whether the field of view of the top-down data reader is targeting the peripheral boundary of the read zone.

5. The data reading system of claim 4, wherein the top-down data reader comprises a fixed focus camera, and wherein the field of view of the top-down data reader encompasses at least half of the surface area of the horizontal surface of the lower housing section.

6. The data reading system of claim 1, the top-down data reader further comprising a vertically oriented post and having an upper post end extending above the upper housing section of the main housing, wherein the top-down data reader is disposed on the upper post end.

7. The data reading system of claim 6, wherein the post includes an adjustment mechanism configured to adjust a height of the post and the distance between the top-down data reader and the horizontal surface of the main housing.

8. The data reading system of claim 6, wherein the data reader main housing includes a chassis, and wherein the post is directly connected to the chassis of the main housing.

9. The data reading system of claim 6, further comprising a counter structure supporting the main housing, wherein the top-down data reader is remotely mounted onto the counter structure separate from the main housing.

10. A method of calibrating a data reading system for reading data on an item, the data reading system including a housing with a lower housing section having a horizontal surface with a reference marking and a horizontal window, an upper housing section disposed on a side of the lower section and having a vertical window, the method comprising:
   adjusting a position of a top-down data reader over the upper housing section;
   projecting a downwardly-facing field of view of the top-down data reader onto the horizontal surface of the lower housing section;
   aligning a reference label bearing a calibration code with the reference marking on the lower housing section, at least a portion of the reference label positioning within a target read zone of the data reading system;
   acquiring an image, via the top-down data reader, based on a coverage area of the field of view, wherein the acquired image further includes at least a portion of the calibration code on the reference label;
   processing the image and calibration code to determine a coverage area of the field of view relative to the target read zone of the data reading system; and
   adjusting the top-down data reader to align the coverage area of the field of view with the target read zone.

11. The method of claim 10, further comprising generating feedback, via a calibration system in communication with the top-down data reader, relating to a position of the coverage area of the field of view relative to the target read zone.

12. The method of claim 10, the data reading system further comprising a plurality of reference markings arranged on the lower housing section to define a border of the target read zone, the method further comprising:
   detecting a location of each of the plurality of reference markings; and
   determining a location of the target read zone based on the location of the reference markings being detected.

13. A method of reading data on an item using a data reading system including a housing with a lower housing section having a horizontal window and an upper housing section disposed on a side of the lower section having a vertical window, the method comprising:
   positioning a top-down data reader at a first position higher than the upper housing section;
   projecting a downwardly-facing field of view of the top-down data reader onto the lower housing section;

projecting a light pattern onto the lower housing section via a light source housed within the top-down data reader, wherein the light pattern further comprises a plurality of beam spots and the lower housing section further includes a plurality of reference markings at least equal in number to the plurality of beam spots;

moving the top-down data reader to align each beam spot of the plurality of beam spots with a corresponding reference marking of the plurality of reference markings on the lower housing section;

acquiring encoded data, via the top-down data reader, from an item bearing the encoded data as the item is passed through the field of view of the top-down data reader; and decoding the encoded data via the top-down data reader.

14. The method of claim 13, further comprising:

after decoding the encoded data, repositioning the top-down data reader to a second position different from the first position;

with the top-down data reader at the second position, projecting the light pattern onto the lower housing section via the light source housed within the top-down data reader; and adjusting the top-down data reader to align the second light pattern with the plurality of reference markings on the lower housing section.

15. A data reading system for reading data on an item, the data reading system comprising:

a main housing including a lower housing section containing a horizontal surface with a horizontal window and an upper housing section containing a vertical window;

a top-down data reader for capturing data from an item in the read zone, the top-down data reader having a downwardly-facing field of view projecting through a scan window and onto the read zone, the top-down data reader positioned at a height higher than a corresponding height of the upper housing section of the main housing; and a calibration system in communication with the top-down data reader, the calibration system comprising:

a reference marking on the horizontal surface of the lower housing section, wherein the calibration system detects the reference marking on the horizontal surface and, in response to detecting the reference marking, generates a feedback signal indicating whether the field of view of the top-down data reader is targeting the read zone; and a reference label bearing a calibration optical code, wherein after a first end of the reference label is aligned with the reference marking on the horizontal surface, the calibration system processes the calibration optical code and generates a second feedback signal indicating whether the field of view of the top-down data reader is in focus.

16. A method of calibrating a data reading system for reading data on an item, the data reading system including a housing with a lower housing section having a horizontal surface and a horizontal window, and upper housing section disposed on a side of the lower section and having a vertical window, and a reference marking on the lower housing section, the method comprising:

adjusting a position of a top-down data reader over the upper housing section;

projecting a downwardly-facing field of view of the top-down data reader onto the horizontal surface of the lower housing section;

aligning a reference label bearing a calibration code with the reference marking on the lower housing section, at least a portion of the reference label within a target read zone of the top-down data reader;

acquiring an image, via the top-down data reader, based on a coverage area of the field of view;

processing the image and the calibration code on the reference label to determine the coverage area of the field of view relative to a target read zone of the data reading system; and adjusting the top-down data reader to align the coverage area of the field of view with the target read zone.

\* \* \* \* \*

UNITED STATES PATENT AND TRADEMARK OFFICE
CERTIFICATE OF CORRECTION

PATENT NO. : 9,268,979 B2
APPLICATION NO. : 14/481571
DATED : February 23, 2016
INVENTOR(S) : Ryan B. Thompson et al.

Page 1 of 1

It is certified that error appears in the above-identified patent and that said Letters Patent is hereby corrected as shown below:

Claims

In column 12, line 29, claim 10, replace "adjusting a position" with --adjusting a height position--.

In column 12, line 36, claim 10, replace "reference label positioning" with --reference label positioned--.

In column 12, lines 42-43, claim 10, replace "to determine a coverage" with --to determine the coverage--.

In column 13, lines 20-21, claim 14, replace "projecting the light pattern" with --projecting a second light pattern--.

In column 13, line 33, claim 15, replace "the read zone" with --a read zone--.

In column 14, line 18, claim 16, replace "and upper housing" with --an upper housing--.

Signed and Sealed this
Third Day of May, 2016

Michelle K. Lee
*Director of the United States Patent and Trademark Office*